United States Patent
Cao

(10) Patent No.: US 11,263,634 B2
(45) Date of Patent: Mar. 1, 2022

(54) PAYMENT METHOD AND DEVICE

(71) Applicant: ADVANCED NEW TECHNOLOGIES CO., LTD., Grand Cayman (KY)

(72) Inventor: Jiajiong Cao, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 16/888,817

(22) Filed: May 31, 2020

(65) Prior Publication Data

US 2020/0294060 A1 Sep. 17, 2020

Related U.S. Application Data

(63) Continuation of application No. PCT/CN2020/071363, filed on Jan. 10, 2020.

(30) Foreign Application Priority Data

Aug. 16, 2019 (CN) .......................... 201910758703.3

(51) Int. Cl.
*G06Q 20/40* (2012.01)
*G06K 9/00* (2022.01)
(Continued)

(52) U.S. Cl.
CPC ....... *G06Q 20/40145* (2013.01); *G06F 3/012* (2013.01); *G06F 3/013* (2013.01); *G06K 9/00255* (2013.01); *G06N 3/08* (2013.01)

(58) Field of Classification Search
CPC .......................... G06Q 20/40145; G06Q 3/012
(Continued)

(56) References Cited

U.S. PATENT DOCUMENTS 6,964,023 B2 11/2005 Maes et al.
7,130,453 B2 10/2006 Kondo et al.
(Continued)

FOREIGN PATENT DOCUMENTS

AU 2009320352 A1 6/2010
AU 2015297035 B2 6/2018
(Continued)

OTHER PUBLICATIONS

Author: Anonymous, publication title: just-auto/Global light vehicle safety systems market—forecasts to 2034 (Jul. 2019) Aroq Limited/Bomsgrove/United Kiongdom, Q3 Edition/Companies, first available Jul. 18, 2019 , pp. 1-78. (Year: 2019).*
(Continued)

*Primary Examiner* — Benjamin S Brindley

(57) ABSTRACT

Methods, systems, and apparatus, including computer programs encoded on computer storage media, for a payment based on a face recognition are provided. One of the methods includes: acquiring first face image information of a target user; extracting first characteristic information from the first face image information, wherein the first characteristic information includes head posture information of the target user and gaze information of the target user; determining whether the target user has a willingness to pay according to the head posture information of the target user and the gaze information of the target user, including determining whether an angle of rotation in each preset direction is less than an angle threshold and whether a probability value that a user gazes at a payment screen is greater than a probability threshold; and in response to determining that the target user has a willingness to pay, completing a payment operation based on the face recognition.

20 Claims, 5 Drawing Sheets

(51) Int. Cl.
*G06N 3/08* (2006.01)
*G06F 3/01* (2006.01)

(58) Field of Classification Search
USPC .......................................................... 705/44
See application file for complete search history.

(56) References Cited

U.S. PATENT DOCUMENTS

| | | | |
|---|---|---|---|
| 8,154,615 | B2 | 4/2012 | Fedorovskaya et al. |
| 8,510,166 | B2 | 8/2013 | Neven |
| 9,207,760 | B1* | 12/2015 | Wu .................... G06K 9/00281 |
| 9,733,703 | B2* | 8/2017 | Sullivan ............. G06K 9/00604 |
| 10,354,126 | B1* | 7/2019 | Nagalla ............ G06Q 20/40145 |
| 2009/0112620 | A1 | 4/2009 | Jung et al. |
| 2013/0266925 | A1 | 10/2013 | Nunamaker, Jr. et al. |
| 2015/0302252 | A1* | 10/2015 | Herrera .............. G06K 9/00281 |
| | | | 382/117 |
| 2016/0366129 | A1* | 12/2016 | Chen ........................ G06F 21/32 |
| 2018/0060648 | A1* | 3/2018 | Yoo .................... G06K 9/00228 |
| 2018/0075443 | A1 | 3/2018 | Fischer et al. |
| 2018/0276467 | A1 | 9/2018 | Kaehler |
| 2018/0307815 | A1* | 10/2018 | Samadani .......... H04N 5/23293 |
| 2018/0364810 | A1* | 12/2018 | Parshionikar ........... G06F 3/012 |
| 2019/0180364 | A1 | 6/2019 | Chong et al. |
| 2019/0212815 | A1* | 7/2019 | Zhang .................... G06F 3/013 |
| 2019/0311301 | A1* | 10/2019 | Pyati ...................... G06F 16/901 |
| 2020/0026917 | A1 | 1/2020 | Qin et al. |
| 2020/0175510 | A1 | 6/2020 | Fang |

FOREIGN PATENT DOCUMENTS

| | | |
|---|---|---|
| CN | 103824068 A | 5/2014 |
| CN | 105184553 A | 12/2015 |
| CN | 106803829 A | 6/2017 |
| CN | 108460599 A | 8/2018 |
| CN | 108615159 A | 10/2018 |
| CN | 109409894 A | 3/2019 |
| CN | 109461003 A | 3/2019 |
| CN | 109711827 A | 5/2019 |
| CN | 109905595 A | 6/2019 |
| CN | 110570200 A | 12/2019 |
| EP | 1968006 B1 | 3/2020 |
| KR | 20190027354 A | 3/2019 |
| KR | 20190051028 A | 5/2019 |
| KR | 20200011405 A | 2/2020 |
| WO | 2017213780 A1 | 12/2017 |
| WO | 2018177312 A1 | 10/2018 |

OTHER PUBLICATIONS

Written Opinion of the International Searching Authority and International Search Report for PCT Application No. PCT/CN2020/071363 dated May 21, 2020 (10 pages).

First Search dated May 19, 2020, issued in related Chinese Application No. 201910758703.3 (1 page).

First Office Action dated May 25, 2020, issued in related Chinese Application No. 201910758703.3, with English machine translation (14 pages).

Supplemental Search dated Jul. 21, 2020, issued in related Chinese Application No. 201910758703.3 (1 page).

\* cited by examiner

PAYMENT METHOD AND DEVICE

CROSS-REFERENCE TO RELATED APPLICATION

This application is a continuation application of International Patent Application No. PCT/CN2020/071363, filed with the China National Intellectual Property Administration (CNIPA) on Jan. 10, 2020, which is based on and claims priority to and benefit of Chinese Patent Application No. 201910758703.3, filed with the CNIPA on Aug. 16, 2019. The entire contents of all of the above-identified applications are incorporated herein by reference.

TECHNICAL FIELD

The application relates to the field of intelligent recognition, and more particular to a payment method, device, and storage medium.

BACKGROUND ART

With the rapid development of Internet technologies, the continuous popularization of face recognition (which is a biological characteristic recognition technology used to perform identity authentication based on face characteristic information of human beings), and related applications, face-scanning payment is currently very popular with a large number of users because of the convenience of completing a payment without scanning a quick response code, carrying any tool, or entering other identity information (such as mobile phone number, paying account and payment password).

Currently, payment methods based on face recognition provided in related technologies mainly take into consideration of a threat to the users' asset because of possible unauthorized scanning or incorrect scanning, and therefore, payments can be completed only after intensive interactions with users. To be specific, a user first needs to press a button to trigger the face-scanning process. After the face-scanning process is started, the user needs to press another button to trigger the payment confirmation process. That is, the user needs to press at least two buttons.

Therefore, a payment method having a high accuracy and requiring simple user interactions needs to be provided.

SUMMARY

One or more embodiments of the specification provide a payment method, device, and storage medium, which can simplify the interaction with the users, and improve the payment recognition accuracy to avoid unauthorized payment caused by unauthorized scanning or incorrect scanning of users and to improve the security of the assets of users. Thus, the recognition accuracy of a users' willingness to pay is guaranteed under the premise of minimum interactions of users.

In a first aspect, one or more embodiments of the specification provide a payment method, which comprises: acquiring first face image information of a target user; extracting characteristic information from the first face image information, wherein the characteristic information includes user head posture information and/or user gaze information; determining whether the target user has the willingness to pay according to the user head posture information and/or the user gaze information; if yes, completing a payment operation based on the face recognition function.

In a second aspect, one or more embodiments of the specification provide a payment device, which comprises: a face image acquisition module, used to acquire first face image information of a target user; a key characteristic extraction module, used to extract characteristic information from the first face image information, wherein the characteristic information includes user head posture information and/or user gaze information; a willingness determination module, used to determine whether the target user has the willingness to pay according to the user head posture information and/or the user gaze information; a payment triggering module, used to complete a payment operation based on the face recognition function if the target user has the willingness to pay.

In a third aspect, one or more embodiments of the specification provide a payment device, which comprises: a processor, and a memory arranged to store computer-executable instructions, when the executable instructions are executed, the processor: acquiring first face image information of a target user; extracting characteristic information from the first face image information, wherein the characteristic information includes user head posture information and/or user gaze information; determining whether the target user has the willingness to pay according to the user head posture information and/or the user gaze information; if yes, completing a payment operation based on the face recognition function.

In a fourth aspect, one or more embodiments of the specification provide a storage medium, used to store computer-executable instructions, the executable instructions implementing the following method when executed by a processor: acquiring first face image information of a target user; extracting characteristic information from the first face image information, wherein the characteristic information includes user head posture information and/or user gaze information; determining whether the target user has the willingness to pay according to the user head posture information and/or the user gaze information; if yes, completing a payment operation based on the face recognition function.

In another aspect, a payment method based on a face recognition is provided. The method comprises: acquiring first face image information of a target user; extracting first characteristic information from the first face image information, wherein the first characteristic information includes head posture information of the target user and gaze information of the target user; determining whether the target user has a willingness to pay according to the head posture information of the target user and the gaze information of the target user, including determining whether an angle of rotation in each preset direction is less than an angle threshold and whether a probability value that a user gazes at a payment screen is greater than a probability threshold, wherein the head posture information includes the angle of rotation in each preset direction, and wherein the gaze information includes the probability value that a user gazes at a payment screen, in response to determining that the angle of rotation in each preset direction is less than the angle threshold and that the probability value that a user gazes at a payment screen is greater than the probability threshold, determining that the target user has a willingness to pay; and in response to determining that the target user has a willingness to pay, completing a payment operation based on the face recognition.

In an embodiment, the completing a payment operation based on the face recognition comprises: triggering and performing a payment initiating operation to acquire second face image information based on the face recognition; determining whether second characteristic information extracted from the second face image information indicates that the user has a willingness to pay; and in response to determining that the second characteristic information indicates that the user has a willingness to pay, triggering and performing a payment confirmation operation to complete the payment operation based on payment account information corresponding to the target user.

In an embodiment, the determining whether second characteristic information extracted from the second face image information indicates that the user has a willingness to pay comprises: determining whether a current user corresponding to the second face image information is consistent with the target user; and in response to determining that the current user is consistent with the target user, determining whether the target user has a willingness to pay according to the second characteristic information extracted from the second face image information.

In an embodiment, the extracting first characteristic information from the first face image information comprises: determining the head posture information of the target user using a head posture recognition model based on the first face image information; and determining the gaze information of the target user using a gaze information recognition model based on characteristics of an eye region in the first face image information.

In an embodiment, the head posture recognition model is obtained through training by: acquiring a first sample data set, wherein the first sample data set includes a plurality of pieces of first sample data, and each of the plurality of pieces of first sample data includes a correspondence between a sample face image and head posture information; determining mean image data and variance image data of a plurality of sample face images; for each of the plurality of pieces of first sample data, preprocessing the sample face image contained in each of the plurality of pieces of first sample data based on the mean image data and the variance image data to obtain a preprocessed sample face image; setting the preprocessed sample face image and the corresponding head posture information as a first model training sample; and performing training using a machine learning method and based on a plurality of first model training samples to obtain the head posture recognition model.

In an embodiment, the gaze information recognition model is obtained through training by: acquiring a second sample data set, wherein the second sample data set includes a plurality of pieces of second sample data, and each of the plurality of pieces of second sample data includes a correspondence between a sample eye image and gaze information; determining mean image data and variance image data of a plurality of sample eye images; for each of the plurality of pieces of second sample data, preprocessing the sample eye image contained in each of the plurality of pieces of second sample data based on the mean image data and the variance image data to obtain a preprocessed sample eye image; setting the preprocessed sample eye image and the corresponding gaze information as a second model training sample; and performing training using a machine learning method and based on a plurality of second model training samples to obtain the gaze information recognition model.

In an embodiment, the angle of rotation in each preset direction comprises a pitch angle, a yaw angle, and a roll angle, wherein the pitch angle refers to an angle of rotation around an X-axis, the yaw angle refers to an angle of rotation around a Y-axis, and the roll angle refers to an angle of rotation around a Z-axis.

In another aspect, a payment device for a payment based on a face recognition is provided. The device comprises: processors, and a non-transitory computer-readable storage medium storing instructions executable by the processor to cause the system to perform operations. The operations comprise: acquiring first face image information of a target user; extracting first characteristic information from the first face image information, wherein the first characteristic information includes head posture information of the target user and gaze information of the target user; determining whether the target user has a willingness to pay according to the head posture information of the target user and the gaze information of the target user, including determining whether an angle of rotation in each preset direction is less than an angle threshold and whether a probability value that a user gazes at a payment screen is greater than a probability threshold, wherein the head posture information includes the angle of rotation in each preset direction, and wherein the gaze information includes the probability value that a user gazes at a payment screen, in response to determining that the angle of rotation in each preset direction is less than the angle threshold and that the probability value that a user gazes at a payment screen is greater than the probability threshold, determining that the target user has a willingness to pay; and in response to determining that the target user has a willingness to pay, completing a payment operation based on the face recognition.

In another aspect, non-transitory computer-readable storage medium for a payment based on a face recognition is provided. The medium is configured with instructions executable by one or more processors to cause the one or more processors to perform operations. The operations comprise: acquiring first face image information of a target user; extracting first characteristic information from the first face image information, wherein the first characteristic information includes head posture information of the target user and gaze information of the target user; determining whether the target user has a willingness to pay according to the head posture information of the target user and the gaze information of the target user, including determining whether an angle of rotation in each preset direction is less than an angle threshold and whether a probability value that a user gazes at a payment screen is greater than a probability threshold, wherein the head posture information includes the angle of rotation in each preset direction, and wherein the gaze information includes the probability value that a user gazes at a payment screen, in response to determining that the angle of rotation in each preset direction is less than the angle threshold and that the probability value that a user gazes at a payment screen is greater than the probability threshold, determining that the target user has a willingness to pay; and in response to determining that the target user has a willingness to pay, completing a payment operation based on the face recognition.

The payment method and device provided in one or more embodiments of the specification are used to acquire first face image information of a target user, extract characteristic information from the first face image information, determine whether the target user has the willingness to pay according to the characteristic information, and if the target user has the willingness to pay, complete a payment operation based on the face recognition function. The face image information of the target user is captured, the required characteristic information is extracted from the face image information, whether the target user has the willingness to pay is identified based on the characteristic information, and whether to start the payment function is determined. One or more embodiments of the specification not only simplify the interaction steps of users, but also improve the payment recognition accuracy to avoid unauthorized payments caused by unauthorized scanning or incorrect scanning of users and improve the security of the assets of users. Thus, the recognition accuracy of the willingness to pay of users is guaranteed under the premise of less interactions of users.

BRIEF DESCRIPTION OF THE DRAWINGS

To clearly describe the technical solutions in one or more embodiments of the specification or in the prior art, the following briefly describes the drawings required in the description of the embodiments or the prior art. The drawings in the following description are only some embodiments of the specification. Without any creative efforts, those skilled in the art can obtain other drawings based on these drawings.

DETAIL DESCRIPTION OF EMBODIMENTS

For those skilled in the art to better understand the technical solutions in one or more embodiments of the specification, the following will clearly and completely describe the technical solutions in one or more embodiments of the specification in combination with the drawings in one or more embodiments of the specification. One or more embodiments described in the specification are only some, but not all the embodiments of the specification. All other embodiments obtained by those skilled in the art based on the one or more embodiments of the specification without any creative efforts should fall within the scope of protection of the specification.

One or more embodiments of the specification provide a payment method, device or device, and storage medium. The face image information of a target user is captured, the required characteristic information is extracted from the face image information, whether the target user has the willingness to pay is identified based on the characteristic information, and whether to start the payment is determined. In this way, the payment method and device not only simplify the interaction steps of users, but also improve the payment recognition accuracy to avoid unauthorized payments caused by unauthorized scanning or incorrect scanning of users and to improve the security of the assets of users. Thus, the recognition accuracy of users' willingness to pay is guaranteed under the premise of less interactions of users.

Figure 1:
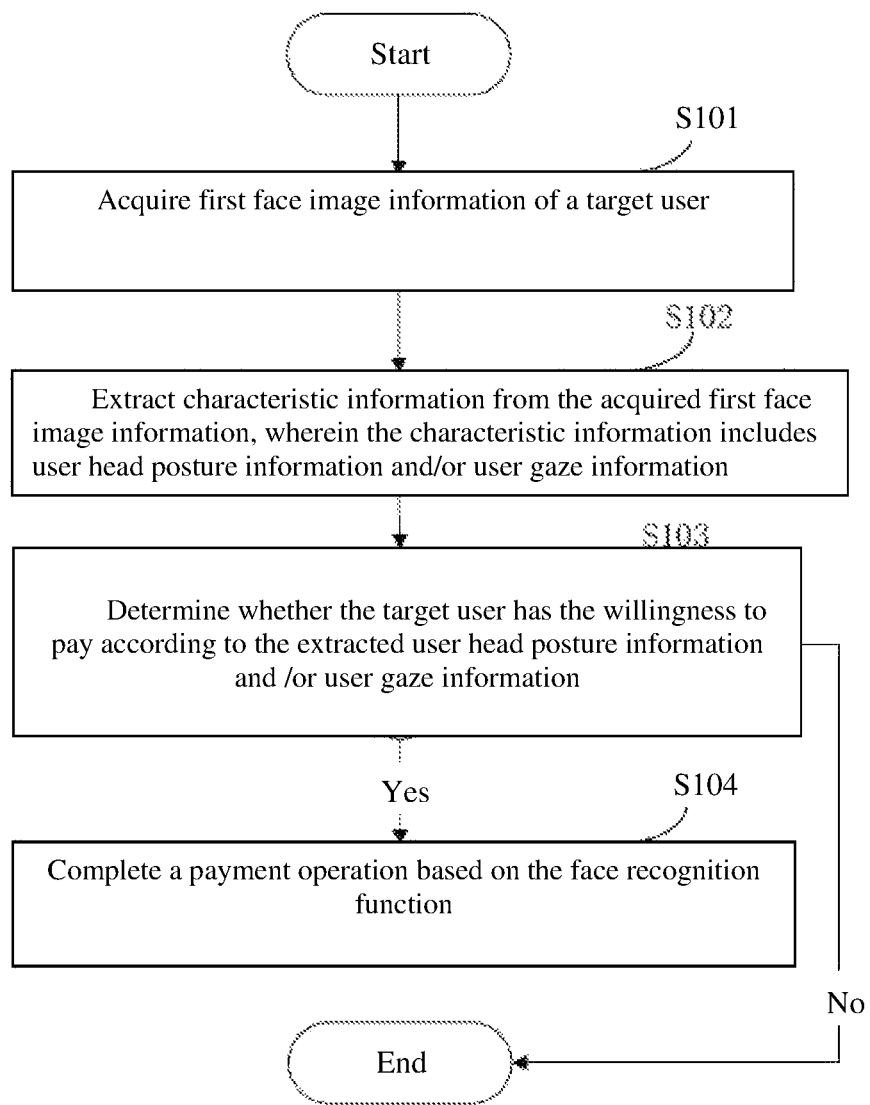
FIG. 1 is a first flowchart of the payment method provided in one or more embodiments of the specification.

FIG. 1 is a first flowchart of the payment method provided in one or more embodiments of the specification, the executive entity of the method shown in FIG. 1 can be user device provided with an identification device identifying users' willingness to pay or a background server therewith. As shown in FIG. 1, the method comprises the following steps.

S101: acquiring first face image information of a target user, wherein the target user is the user currently captured by a camera, and the first face image information can be captured and extracted by the camera and transmitted to a face recognition system.

The application scenarios where the face-scanning payment is supported may include, for example, a vending machine arranged in a public place in a shopping mall or self-service payment device arranged at a supermarket checkout counter or in a restaurant. The first face image information is captured by the camera installed on the vending machine or the self-service payment device.

S102: extracting characteristic information (i.e., first characteristic information) from the acquired first face image information, wherein the characteristic information includes user head posture information and/or user gaze information.

After the first face image information is captured by the camera, characteristics are extracted using a preset image recognition method from the first face image information to obtain the required characteristic information. The characteristic information can include user head posture information, user gaze information, or both user head posture information and user gaze information.

S103: determining whether the target user has the willingness to pay according to the user head posture information and/or the user gaze information.

After the required characteristic information is extracted from the first face image information, the target user's willingness to pay is identified according to the characteristic information, that is, the target user's willingness to pay is identified using the image characteristic extraction method. Then whether to trigger the payment initiating process or payment confirmation process is determined. When the characteristic information satisfies preset conditions, the target user is determined to have the willingness to pay, that is, the target user expects to complete a face-scanning payment operation. Accordingly, when the characteristic information includes both user head posture information and user gaze information, if user head posture information satisfies a first preset condition and user gaze information satisfies a second preset condition, the target user is determined to have the willingness to pay, that is, the target user has the desire to make a payment.

If the target user has the willingness to pay, proceed to step S104 to complete a payment operation based on the face recognition function. If the target user is determined to have the willingness to pay according to the characteristic information extracted from the first face image information, the face-scanning payment can be automatically completed.

The identification of the user's willingness to pay using the image characteristic extraction method can solve the problem of unauthorized payments caused by unauthorized scanning or incorrect scanning of a user. For example, when both user A and user B are in a line in front of a face-scanning payment device, the current user A needs to make a face-scanning payment but user B is in front of user A, even if the captured first face image information is the image information of user B, step S104 will not be performed since user B has no willingness to pay, because the characteristic information extracted from the first face image information indicates that the target user (user B) has no willingness to pay. Thus, the incorrect face-scanning payment phenomenon that user A buys but money is deducted from the account of user B can be prevented.

In one or more embodiments of the specification, the face image information of a target user is captured, the required characteristic information is extracted from the face image information, whether the target user has the willingness to pay is identified based on the characteristic information, and whether to initiate the payment function is determined. One or more embodiments of the specification not only simplify the interaction steps of users, but also improve the payment recognition accuracy to avoid unauthorized payments caused by unauthorized scanning or incorrect scanning of users and improve the security of the assets of users. Thus, the recognition accuracy of the users' willingness to pay is guaranteed under the premise of less interactions of users.

The serial numbering of steps S101 to S104 do not define the sequence of the specific implementation steps.

Figure 2:
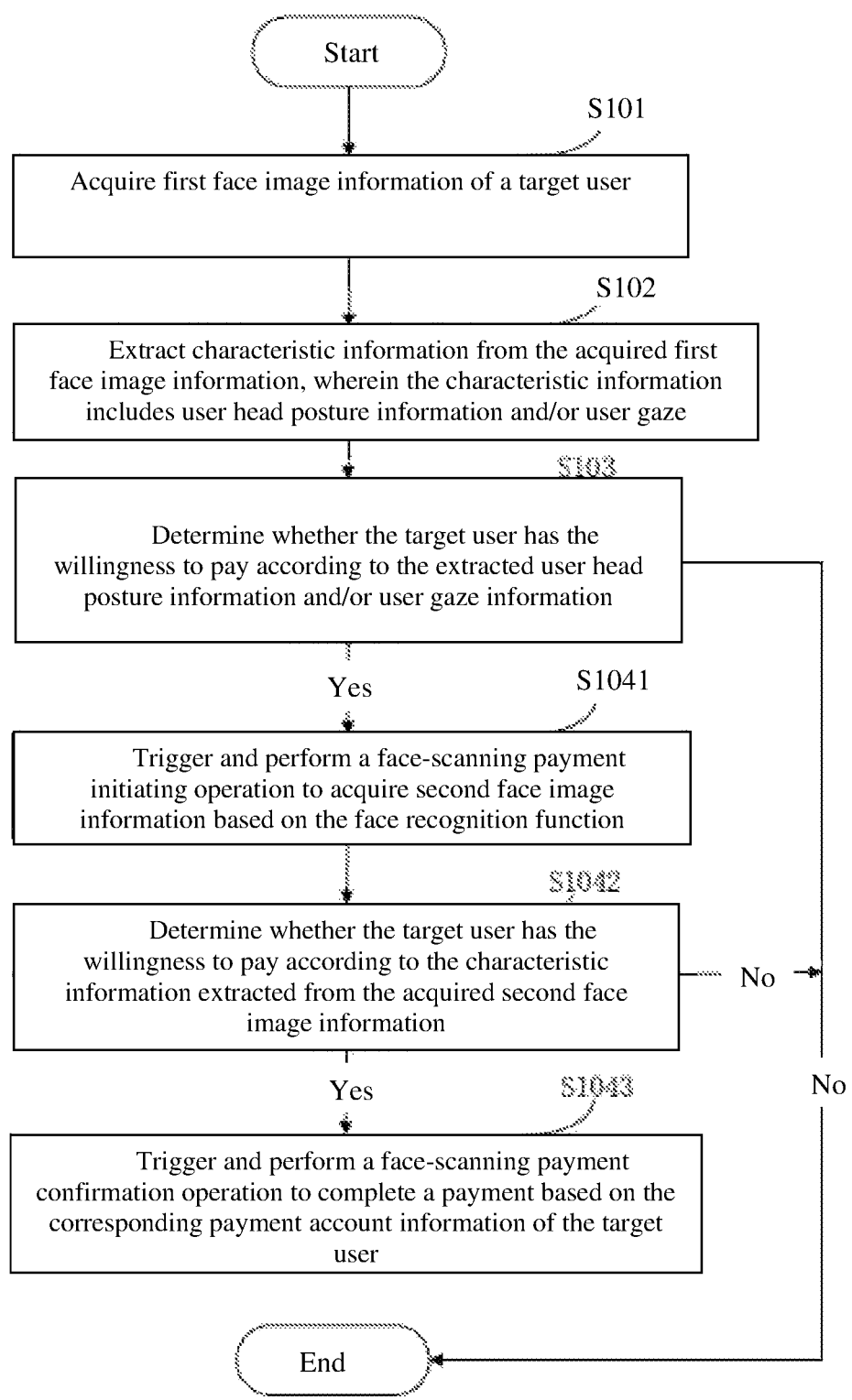
FIG. 2 is a second flowchart of the payment method provided in one or more embodiments of the specification.

To further improve the accuracy of payment identification, whether to trigger the face-scanning payment initiating process is identified based on first face image information, and whether to proceed to the face-scanning payment process is identified based on second face image information. By introducing the double face characteristic recognition steps to confirm the willingness to pay of a user twice and respectively determine whether to trigger the payment initiating and payment confirmation processes, the accuracy of payment identification is further improved. As shown in FIG. 2, step S104 of completing a payment operation based on the face recognition function comprises the following steps.

S1041: triggering and performing a face-scanning payment initiating operation to acquire second face image information based on the face recognition function.

After steps S101 to S103, when the willingness to pay of the target user is determined based on first face image information, the face-scanning payment initiating process is triggered. At this time, the payment and money deduction process are not performed, but the currently captured second face image information is acquired by a camera. The first face image information and the second face image information are successively captured by the camera, and the second face image information is captured later than the first face image information is captured.

S1042: determining whether the target user has the willingness to pay according to the characteristic information extracted from the second face image information.

After the second face image information is acquired, characteristics are also extracted from the second face image information to obtain the required characteristic information using the preset image recognition method. The characteristic information can include user head posture information, user gaze information, or both user head posture information and user gaze information. The process of extraction of characteristic information from the second face image information is the same as the process of extraction of characteristic information from the first face image information. For the specific process, see the above S102.

After characteristic information is extracted from second face image information, whether the target user has the willingness to pay is also determined according to the characteristic information, wherein the process of determining whether the target user has the willingness to pay based on the characteristic information extracted from the second face image information is the same as the process of determining whether the target user has the willingness to pay based on the characteristic information extracted from the first face image information. For the specific process, see above step S103.

If the target user has the willingness to pay, perform step S1043 to trigger and perform a face-scanning payment confirmation operation to complete a payment based on the corresponding payment account information of the target user.

If it is determined that the current user has the willingness to pay based on the characteristic information extracted from the second face image information, the method proceed to the face-scanning payment process, namely, the amount required to be paid is deducted from the corresponding payment account. In other words, the face-scanning payment process is proceeded only when both the characteristic information extracted from the first face image information and the characteristic information extracted from the second face image information satisfy the preset conditions.

Figure 3:
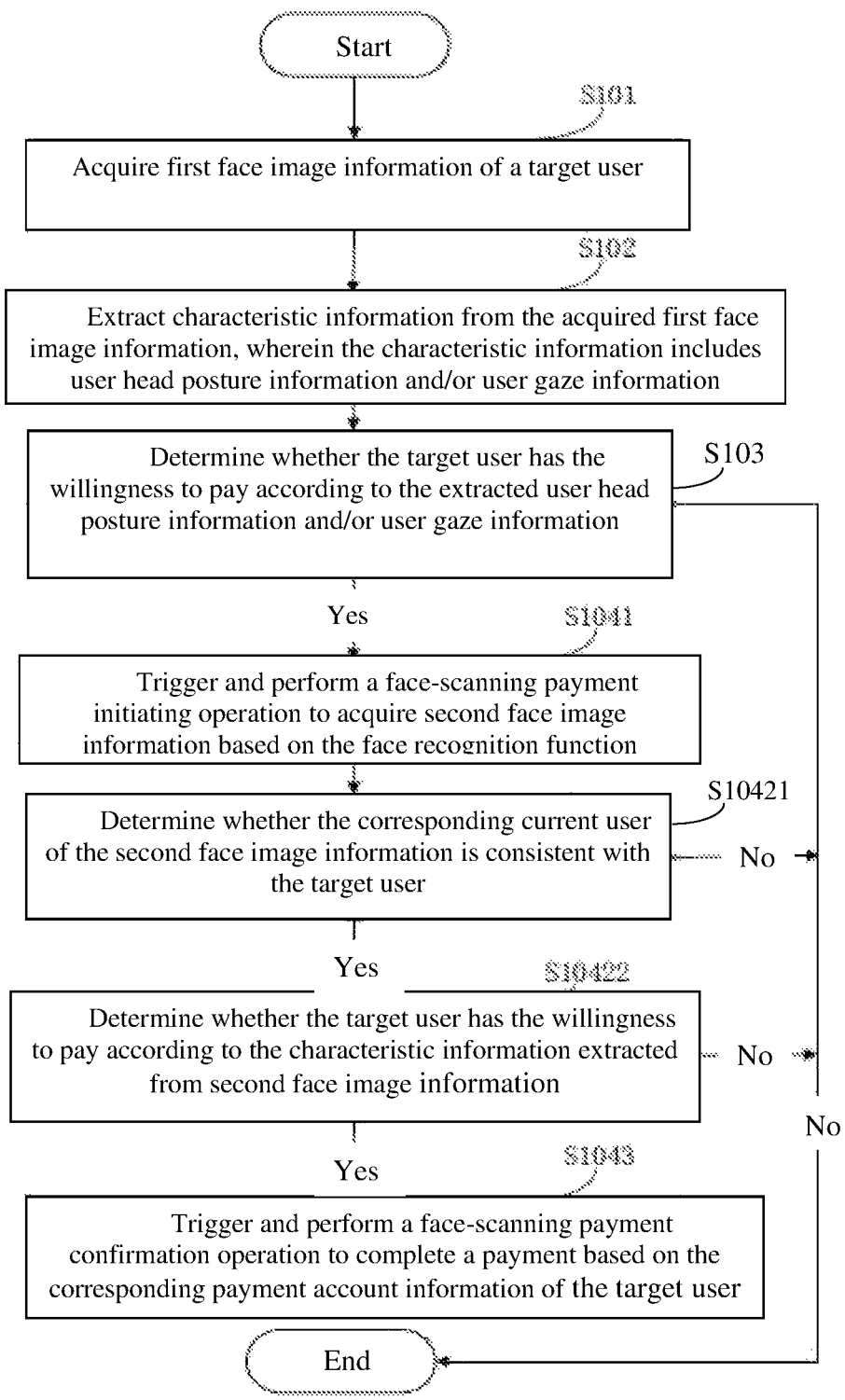
FIG. 3 is a third flowchart of the payment method provided in one or more embodiments of the specification.

Further, the target user may give up making the final payment and leave halfway for some reason. After the method proceeds to the face-scanning payment process, the current user corresponding to the captured second face image information may be different from the target user. If the face-scanning payment process continues in this case, payment caused by the incorrect scanning will occur. As shown in FIG. 3, step S1042 of determining whether the target user has the willingness to pay according to the characteristic information extracted from the acquired second face image information comprises following steps.

S10421: determining whether the corresponding current user of the acquired second face image information is consistent with the target user.

Since the corresponding user of the captured second face image information is different from the target user if the target user leaves halfway for some reason, for a face-scanning payment process, it is necessary to determine whether the first face triggering the face-scanning payment initiating operation and the second face triggering the face-scanning payment confirmation operation are the same face.

If they are the same face, perform step S10422 to determine whether the target user has the willingness to pay according to the characteristic information extracted from the second face image information.

If it is confirmed that the corresponding current user of the captured second face image information and the target user are the same user, the step of determining again whether the target user has the willingness to pay based on the characteristic information extracted from the second face image information will continue to be performed to determine whether to go to the face-scanning payment process.

To improve the accuracy of the characteristic information in the process of extraction of characteristic information from the first face image information and then improve the accuracy of the determination of the willingness to pay based on the characteristic information, a corresponding recognition model is obtained through training, and then characteristic information is extracted from the face image information using the recognition model. Step S102 of extracting characteristic information from the acquired first face image information comprises the following steps.

Sub-step 1: determining user head posture information of the target user by using a head posture model such as a trained head posture recognition model based on the acquired first face image information, wherein the user head posture information includes an angle of rotation in a preset direction.

The head posture recognition model can be a machine learning model having a neural network structure, and is obtained by training a first sample data set using the machine learning method in advance.

Specifically, the first face image information is used as input of the head posture recognition model, and the neural network structure of the head posture recognition model extracts the characteristics from the first face image information. Accordingly, the output of the head posture recognition model is the user head posture information of the target user, wherein the user head posture information includes an angle of rotation in a preset direction, for example, an angle of rotation of the head in the pitch, yaw, and roll directions. A pitch angle refers to an angle of rotation around a X-axis, a yaw angle refers to an angle of rotation around a Y-axis, and a roll angle refers to an angle of rotation around a Z-axis, wherein the angle of rotation in a preset direction is directly related to the face-scanning payment willingness of a user.

Sub-step 2: determining user gaze information of the target user by using a gaze model such as a trained gaze information recognition model based on the characteristics of the eye region in the acquired first face image information, wherein the user gaze information includes at least either of the probability value that the user gazes at a payment screen and the probability value that the user does not gaze at the payment screen.

The gaze information recognition model can be a machine learning model having a neural network structure and is obtained by training a second sample data set using the machine learning method in advance.

Specifically, the first face image information is used as input of the gaze information recognition model and the neural network structure of the gaze information recognition model extracts characteristics from the first face image information. Accordingly, the output of the gaze information recognition model is the user gaze information of the target user, wherein the user gaze information can include the probability value that the eyes of the user gaze at the payment screen, namely, the probability value that the eyes of the user gaze at the direction of the interactive screen. The larger the probability value is, the higher the probability that the eyes of the user gaze at the camera and the interactive screen is. Accordingly, the willing to pay of the user is stronger.

If the characteristic information includes user head posture information, step S102 comprises sub-step 1, if the characteristic information includes user gaze information, step S102 comprises sub-step 2, and if the characteristic information includes user head posture information and user gaze information, step S102 comprises sub-step 1 and sub-step 2.

Since a head posture recognition model needs to be used in the process of extraction of user head posture information from the first face image information, it is necessary to obtain the head posture recognition model by training a sample data set. Specifically, the head posture recognition model is obtained through training in the following way.

Step 1: acquiring a first sample data set, wherein the first sample data set includes a plurality of pieces of first sample data, and each piece of the first sample data includes a correspondence between a sample face image and head posture information.

Specifically, the first sample data set contains a plurality of pieces of tagged first sample data, namely, a plurality of sample face images tagged with head posture information. The first sample data set is a set $X=\{x_1, x_2, \ldots, x_n\}$ of a plurality of tagged head region samples, wherein $x_n$ represents a tagged head region sample indexed n (namely, sample face image whose serial number is n).

The head posture information includes an angle of rotation of the head in the sample face image in a preset direction, for example, an angle of rotation of the head in the pitch, yaw, and roll directions. A pitch angle refers to an angle of rotation around a X-axis, a yaw angle refers to refers to an angle of rotation around a Y-axis, and a roll angle refers to an angle of rotation around a Z-axis.

Step 2: determining the mean image data and the variance image data of a plurality of sample face images, wherein mean value processing is performed for the plurality of sample face images in the first sample data set to obtain the mean image data of the plurality of sample face images, and variance processing is performed for the plurality of sample face images in the first sample data set to obtain the variance image data of the plurality of sample face images.

In an implementation, it is necessary to pre-process the original sample face images in the first sample data set to improve the accuracy of extraction of characteristic information of the final head posture recognition model. Therefore, it is necessary to determine the mean image data and the variance image data of a plurality of sample face images first.

Step 3: for each piece of the first sample data, preprocessing the sample face image contained in the piece of first sample data based on the mean image data and the variance image data to obtain a preprocessed sample face image.

Specifically, preprocessing of sample face images can comprise dividing the difference between original sample face images and the mean image data by the variance image data to obtain a plurality of tagged and preprocessed sample face images.

Step 4: determining the preprocessed sample face image and the corresponding head posture information as a final first model training sample.

Step 5: training using the machine learning method and based on a plurality of first model training samples to obtain the head posture recognition model.

Specifically, optimization training is performed for the model parameters of the preset first machine learning model using the machine learning method and based on a plurality of first model training samples. The first machine learning model with the optimal model parameters is determined to be the trained head posture recognition model. The head posture information includes an angle of rotation of the head in the sample face images in the pitch, yaw, and roll directions. Accordingly, first machine learning model comprises three independent regressive loss functions, network training is performed for the parameters of the three independent regressive loss functions, and the regressive loss functions respectively correspond to the angles of rotation in the preset directions.

Since a gaze information recognition model needs to be used in the process of extraction of user gaze information from the first face image information, it is necessary to obtain the gaze information recognition model by training a sample data set. The gaze information recognition model is obtained through training in the following way.

Step 1: acquiring a second sample data set, wherein the second sample data set includes a plurality of pieces of second sample data, and each piece of the second sample data includes a correspondence between a sample eye image and gaze information.

Specifically, the second sample data set contains a plurality of pieces of tagged second sample data, namely, a plurality of sample eye images tagged with gaze information. The second sample data set is a set $E=\{e_1, e_2, \ldots, e_n\}$ of a plurality of tagged eye region samples, wherein $e_n$ represents a tagged eye region sample indexed n (namely, sample eye image whose serial number is n), and wherein the gaze information corresponding to the sample eye sample indicates whether the eyes of the user gaze at the direction of the interactive screen.

Step 2: determining the mean image data and the variance image data of a plurality of sample eye images, wherein mean value processing is performed for the plurality of sample eye images in the second sample data set to obtain the mean image data of the plurality of sample eye images, and variance processing is performed for the plurality of sample eye images in the second sample data set to obtain the variance image data of the plurality of sample eye images.

In an implementation, it is necessary to pre-process the original sample eye images in the second sample data set to improve the accuracy of extraction of characteristic information of the final gaze information recognition model. Therefore, it is necessary to determine the mean image data and the variance image data of a plurality of sample eye images first.

Step 3: for each piece of the second sample data, preprocessing the sample eye image contained in the piece of second sample data based on the mean image data and the variance image data to obtain a preprocessed sample eye image.

Specifically, preprocessing of sample eye images can comprise dividing the difference between original sample eye images and the mean image data by the variance image data to obtain a plurality of tagged and preprocessed sample eye images.

Step 4: determining the preprocessed sample eye image and the corresponding gaze information to be a final second model training sample.

Step 5: training using the machine learning method and based on a plurality of second model training samples to obtain the gaze information recognition model.

Specifically, optimization training is performed for the model parameters of the preset second machine learning model using the machine learning method and based on a plurality of second model training samples, and the second machine learning model with the optimal model parameters is determined to be the trained gaze information recognition model. The second machine learning model comprises a dichotomous loss function, network training is performed for the parameters of the dichotomous loss function, and the two classes are the eye gazing at the interactive screen and the eye not gazing at the interactive screen, respectively.

In combination with the above-mentioned specific implementation process, after characteristic information is extracted from the first face image information, it is necessary to identify the willingness to pay of a user. Step S103 of determining whether the target user has the willingness to pay according to the extracted user head posture information and/or the user gaze information specifically comprises followings.

In an embodiment, whether the angle of rotation in each preset direction is less than a preset angle threshold and whether the probability value of the user gazing at a payment screen is greater than a preset probability threshold are determined, if the characteristic information includes user head posture information and user gaze information.

The target user has the willingness to pay is determined, if the angle of rotation in each preset direction is less than a preset angle threshold and the probability value of the user gazing at a payment screen is greater than a preset probability threshold.

Assuming that the user head posture information includes an angle $A_{pitch}$ of rotation in the pitch direction, an angle $A_{yaw}$ of rotation in the yaw direction, and an angle $A_{roll}$ of rotation in the roll direction, and the preset angle threshold in the pitch direction is $T_{pitch}$, the preset angle threshold in the yaw direction is $T_{yaw}$, and the preset angle threshold in the roll direction is $T_{roll}$, when the plane of the face is parallel to the plane of the interactive screen, the three angles of rotation are all zero. If $A_{pitch}<T_{pitch}$, $A_{yaw}<T_{yaw}$ and $A_{roll}<T_{roll}$, then it is determined that user head posture information satisfies a first preset condition.

Accordingly, assuming that user gaze information includes the probability value focus $P_{focus}$ of the user gazing at the payment screen and the preset probability threshold is focus $T_{focus}$, if $P_{focus}>T_{focus}$, it is determined that user gaze information satisfies a second preset condition.

If the user head posture information satisfies the first preset condition and the user gaze information satisfies the second preset condition, it is determined that the target user has the willingness to pay.

In an embodiment, whether the angle of rotation in each preset direction is less than a preset angle threshold is determined, if the characteristic information includes only user head posture information.

The target user has the willingness to pay, if the angle of rotation in each preset direction is less than a preset angle threshold.

Assuming that the user head posture information includes an angle $A_{pitch}$ of rotation in the pitch direction, an angle $A_{yaw}$ of rotation in the yaw direction, and an angle $A_{roll}$ of rotation in the roll direction, and the preset angle threshold in the pitch direction is $T_{pitch}$, the preset angle threshold in the yaw direction is $T_{yaw}$, and the preset angle threshold in the roll direction is $T_{roll}$, when the plane of the face is parallel to the plane of the interactive screen, the three angles of rotation are all zero. If $A_{pitch}<T_{pitch}$, $A_{yaw}<T_{yaw}$, and $A_{roll}<T_{roll}$, then it is determined that the target user has the willingness to pay.

In an embodiment, whether the probability value of the user gazing at a payment screen is greater than a preset probability threshold is determined, if the characteristic information includes only user gaze information.

The target user has the willingness to pay, if the probability value of the user gazing at a payment screen is greater than a preset probability threshold.

Assuming that user gaze information includes the probability value $P_{focus}$ of the user gazing at the payment screen and the preset probability threshold is $T_{focus}$, if $P_{focus}>T_{focus}$, it is determined that the target user has the willingness to pay.

Figure 4:
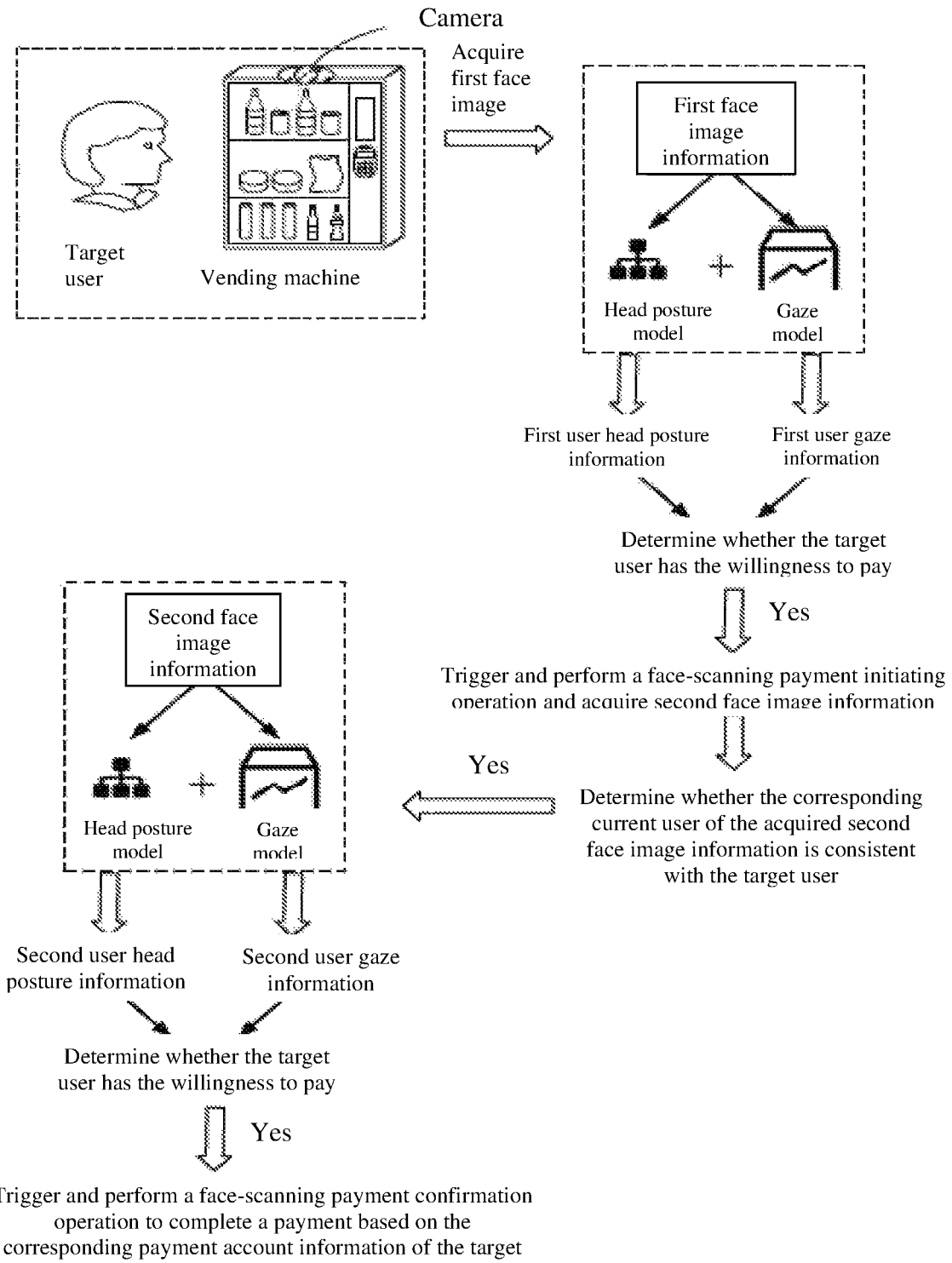
FIG. 4 is a schematic diagram of the specific principle of the payment method provided in one or more embodiments of the specification.

In an embodiment, for example, in an application scenario of a vending machine arranged in a public place in a shopping mall, FIG. 4 shows the specific implementation principle of the payment method. The payment method specifically comprises followings.

Step 1: acquiring first face image information of a target user, wherein the target user is the user currently captured by the camera that is arranged on the vending machine. The camera captures face images of the target user located in the imaging area, the first face image information can be captured by the camera and transmitted to a face recognition system.

Step 2: extracting first user head posture information from the first face image information using the pre-trained head posture recognition model, and extracting first user gaze information from the first face image information using the pre-trained gaze information recognition model.

Step 3: determining whether the target user has the willingness to pay according to the first user head posture information and the first user gaze information.

Step 4: if the target user has the willingness to pay, triggering and performing a face-scanning payment initiating operation and acquiring second face image information based on the face recognition function.

Step 5: determining whether the corresponding current user of the acquired second face image information is consistent with the target user, namely, determining whether the current user and the target user are the same user.

Step 6: if the current user and the target user are the same user, extracting second user head posture information from the second face image information using the pre-trained head posture recognition model, and extracting second user gaze information from the second face image information using the pre-trained gaze information recognition model.

Step 7: determining again whether the target user has the willingness to pay according to the second user head posture information and the second user gaze information.

Step 8: if the target user is determined to have the willingness to pay again, triggering and performing a face-scanning payment confirmation operation to complete a payment based on the corresponding payment account information of the target user.

In the payment method in one or more embodiments of the specification, first face image information of a target user is acquired, characteristic information is extracted from the first face image information, whether the target user has the willingness to pay is determined according to the characteristic information, and if the determination result is that the target user has the willingness to pay, a payment operation is completed based on the face recognition function. The face image information of the target user is captured, the required characteristic information is extracted from the face image information, whether the target user has the willingness to pay is identified based on the characteristic information, and whether to start the payment function is determined. One or more embodiments of the specification not only simplify the interaction steps of users, but also improve the payment recognition accuracy to avoid unauthorized payments caused by unauthorized scanning or incorrect scanning and improve the security of the assets of users. Thus, the recognition accuracy of the willingness to pay of users is guaranteed under the premise of less interactions of users.

Figure 5:
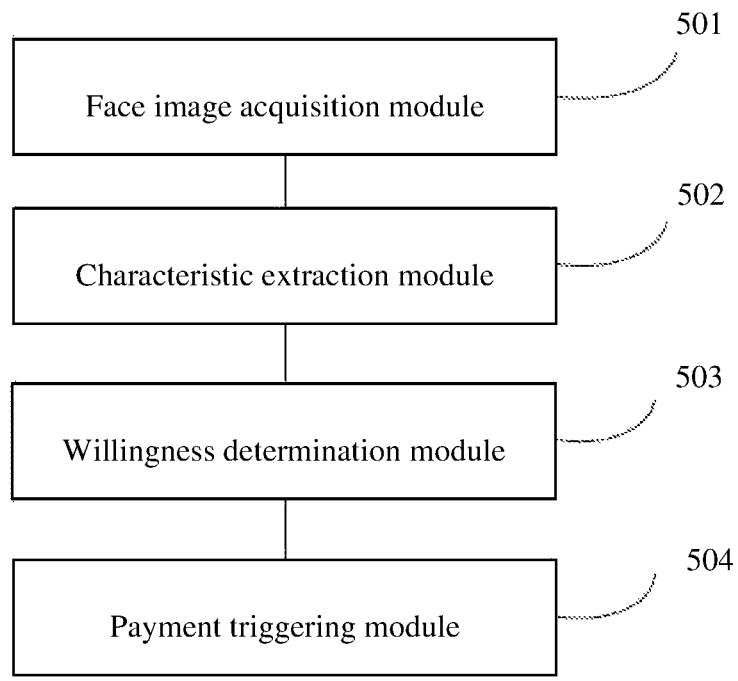
FIG. 5 shows the module composition of the payment device provided in one or more embodiments of the specification.

Corresponding to the payment method described in FIGS. 1 to 4, one or more embodiments of the specification further provide a payment device based on the same technical conception. FIG. 5 shows the modules of the payment device provided in one or more embodiments of the specification, and the payment device is used to execute the payment method described in FIGS. 1 to 4. As shown in FIG. 5, the payment device comprises: a face image acquisition module 501, used to acquire first face image information of a target user; a characteristic extraction module 502, used to extract characteristic information from the first face image information, wherein the characteristic information includes user head posture information and/or user gaze information; a willingness determination module 503, used to determine whether the target user has the willingness to pay according to the user head posture information and/or the user gaze information; a payment triggering module 504, used to complete a payment operation based on the face recognition function if the target user has the willingness to pay.

In one or more embodiments of the specification, the face image information of a target user is captured, the required characteristic information is extracted from the face image information, whether the target user has the willingness to pay is identified based on the characteristic information, and whether to start the payment function is determined accordingly. One or more embodiments the specification not only simplify the interaction steps of users, but also improve the payment recognition accuracy to avoid unauthorized payments caused by unauthorized scanning or incorrect scanning of users and improve the security of the assets of users. Thus, the recognition accuracy of the willingness to pay of users is guaranteed under the premise of less interactions of users.

In an embodiment, the payment triggering module 504 is used to: trigger and perform a face-scanning payment initiating operation to acquire second face image information based on the face recognition function; determine whether the target user has the willingness to pay according to the characteristic information extracted from the second face image information; if the target user has the willingness to pay, trigger and perform a face-scanning payment confirmation operation to complete a payment based on the corresponding paying account information of the target user.

In an embodiment, the payment triggering module 504 is further used to: determine whether the corresponding current user of the second face image information is consistent with the target user; and if the corresponding current user of the second face image information is consistent with the target user, determine whether the target user has the willingness to pay according to the characteristic information extracted from the second face image information.

In an embodiment, the key characteristic extraction module 502 is used to: determine user head posture information of the target user using a pre-trained head posture recognition model and based on the first face image information, wherein the user head posture information includes an angle of rotation in a preset direction; and/or determine user gaze information of the target user using a pre-trained gaze information recognition model and based on the characteristics of the eye region in the first face image information, wherein the user gaze information includes the probability value of the user gazing at a payment screen and/or the probability value of the user not gazing at the payment screen.

In an embodiment, the head posture recognition model is obtained through training by: acquiring a first sample data set, wherein the first sample data set includes a plurality of pieces of first sample data, and each piece of the first sample data includes a correspondence between a sample face image and head posture information; determining the mean image data and variance image data of the plurality of sample face images; for each piece of the first sample data, preprocessing the sample face image contained in the piece of first sample data based on the mean image data and the variance image data to obtain a preprocessed sample face image; determine the preprocessed sample face image and the corresponding head posture information as a final first model training sample; and training using the machine learning method and based on a plurality of the first model training samples to obtain the head posture recognition model.

In an embodiment, the gaze information recognition model is obtained through training by: acquiring a second sample data set, wherein the second sample data set includes a plurality of pieces of second sample data, and each piece of the second sample data includes a correspondence between a sample eye image and gaze information; determining the mean image data and variance image data of the plurality of sample eye images; for each piece of the second sample data, preprocessing the sample eye image contained in the piece of second sample data based on the mean image data and the variance image data to obtain a preprocessed sample eye image; determining the preprocessed sample eye image and the corresponding gaze information as a final second model training sample; and perform training using the machine learning method and based on a plurality of the second model training samples to obtain the gaze information recognition model.

In an embodiment, the willingness determination module 503 is used to: determine whether the angle of rotation in each preset direction is less than a preset angle threshold and determine whether the probability value of the user gazing at a payment screen is greater than a preset probability threshold if the characteristic information includes user head posture information and user gaze information, and determine the target user has the willingness to pay if both the angle of rotation in each preset direction is less than a preset angle threshold and the probability value of the user gazing at a payment screen is greater than a preset probability threshold; or determine whether the angle of rotation in each preset direction is less than a preset angle threshold if the characteristic information includes user head posture information, and determine the target user has the willingness to pay if the angle of rotation in each preset direction is less than a preset angle threshold; or determine whether the probability value of the user gazing at a payment screen is greater than a preset probability threshold if the characteristic information includes user gaze information, and determine the target user has the willingness to pay if the probability value of the user gazing at a payment screen is greater than a preset probability threshold.

The payment device in one or more embodiments of the specification acquires face image information of a target user, extracts characteristic information from the first face image information, determines whether the target user has the willingness to pay according to the characteristic information, and if the determination result is that the target user has the willingness to pay, completes a payment operation based on the face recognition function. The face image information of the target user is captured, the required characteristic information is extracted from the face image information, whether the target user has the willingness to pay is identified based on the characteristic information, and whether to start the payment function is determined. One or more embodiments of the specification not only simplify the interaction steps of users, but also improve the payment recognition accuracy to avoid unauthorized payments caused unauthorized scanning or incorrect scanning of users and improve the security of the assets of users. Thus, the recognition accuracy of the willingness to pay of users is guaranteed under the premise of less interactions of users.

The embodiment of the payment device and the embodiment of the payment method are based on the same conception in the specification. Therefore, for the implementation of the embodiment of the payment device, please refer to the implementation of the corresponding payment method. The description is not repeated herein.

Figure 6:
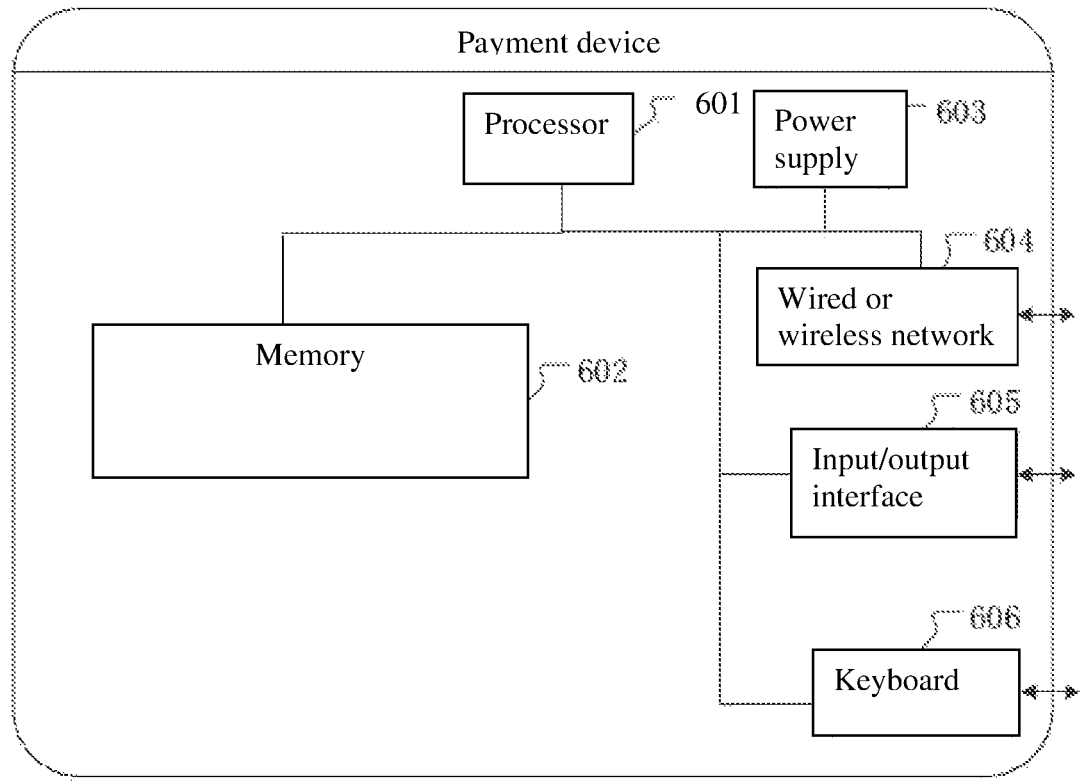
FIG. 6 shows the structure of the payment device provided in one or more embodiments of the specification.

Further, corresponding to the method shown in FIGS. 1 to 4, one or more embodiments of the specification provide a payment device based on the same technical conception. The payment device is used to execute the above-mentioned payment method, as shown in FIG. 6.

The payment device, which varies greatly with the configuration or performance, can comprise one or more processors 601 and a memory 602. One or more applications or data can be stored in the memory 602. The memory 602 can be a volatile memory or a permanent memory. The applications stored in the memory 602 can comprises one or more modules (not shown) and each module can comprise a series of computer-executable instructions in the payment device. Further, the processor 601 can be configured to communicate with the memory 602 and execute the series of computer-executable instructions in the memory 602 on the payment device. The payment device can further comprise one or more power supplies 603, one or more wired or wireless network interfaces 604, one or more input/output interfaces 605, and one or more keyboards 606.

In an embodiment, the payment device comprises a memory and one or more programs, wherein one or more programs are stored in the memory, one or more programs can comprise one or more modules, each module can comprise a series of computer-executable instructions in the payment device, and after configurations, one or more processors execute the following computer-executable instructions comprised in one or more programs: acquiring first face image information of a target user; extracting characteristic information from the first face image information, wherein the characteristic information includes user head posture information and/or user gaze information; determining whether the target user has the willingness to pay according to the user head posture information and/or the user gaze information; if determining that the target user has the willingness to pay, completing a payment operation based on the face recognition function.

In one or more embodiments of the specification, the face image information of a target user is captured, the required characteristic information is extracted from the face image information, whether the target user has the willingness to pay is identified based on the characteristic information, and whether to start the payment function is determined. One or more embodiments the specification not only simplify the interaction steps of users, but also improve the payment recognition accuracy to avoid unauthorized payments caused by unauthorized scanning or incorrect scanning of users and improve the security of the assets of users. Thus, the recognition accuracy of the willingness to pay of users is guaranteed under the premise of less interactions of users.

In an embodiment, when the computer-executable instructions are executed, completing a payment operation based on the face recognition function comprises: triggering and performing a face-scanning payment initiating operation to acquire second face image information based on the face recognition function; determining whether the target user has the willingness to pay according to the characteristic information extracted from the second face image information; and if determining that the target user has the willingness to pay, triggering and performing a face-scanning payment confirmation operation to complete a payment based on the corresponding paying account information of the target user.

In an embodiment, when the computer-executable instructions are executed, determining whether the target user has the willingness to pay according to the characteristic information extracted from the second face image information comprises: determining whether the corresponding current user of the second face image information is consistent with the target user; and if determining that the corresponding current user of the second face image information is consistent with the target user, determining whether the target user has the willingness to pay according to the characteristic information extracted from the second face image information.

In an embodiment, when the computer-executable instructions are executed, extracting characteristic information from the first face image information comprises: determining user head posture information of the target user by using a trained head posture recognition model and based on the first face image information, wherein the user head posture information includes an angle of rotation in a preset direction; and/or, determining user gaze information of the target user by using a trained gaze information recognition model and based on the characteristics of the eye region in the first face image information, wherein the user gaze information includes at least the probability value of the user gazing at a payment screen and the probability value of the user not gazing at the payment screen.

In an embodiment, when the computer-executable instructions are executed, the head posture recognition model is obtained through training by: acquiring a first sample data set, wherein the first sample data set includes a plurality of pieces of first sample data and each piece of the first sample data includes a correspondence between a sample face image and head posture information; determining the mean image data and variance image data of the plurality of sample face images; for each piece of the first sample data, preprocessing the sample face image contained in the piece of first sample data based on the mean image data and the variance image data to obtain a preprocessed sample face image; determining the preprocessed sample face image and the corresponding head posture information as a final first model training sample; and training by using the machine learning method and based on a plurality of the first model training samples to obtain the head posture recognition model.

In an embodiment, when the computer-executable instructions are executed, the gaze information recognition model is obtained through training by: acquiring a second sample data set, wherein the second sample data set includes a plurality of pieces of second sample data and each piece of the second sample data includes a correspondence between a sample eye image and gaze information; determining the mean image data and variance image data of the plurality of sample eye images; for each piece of the second sample data, preprocessing the sample eye image contained in the piece of second sample data based on the mean image data and the variance image data to obtain a preprocessed sample eye image; determining the preprocessed sample eye image and the corresponding gaze information as a final second model training sample; and training by using the machine learning method and based on a plurality of the second model training samples to obtain the gaze information recognition model.

In an embodiment, when the computer-executable instructions are executed, determining whether the target user has the willingness to pay according to the user head posture information and/or the user gaze information comprises: determining whether the angle of rotation in each preset direction is less than a preset angle threshold and determining whether the probability value of the user gazing at a payment screen is greater than a preset probability threshold if the characteristic information includes user head posture information and user gaze information, and determining the target user has the willingness to pay if the angle of rotation in each preset direction is less than a preset angle threshold and the probability value of the user gazing at a payment screen is greater than a preset probability threshold; or determining whether the angle of rotation in each preset direction is less than a preset angle threshold if the characteristic information includes user head posture information, and determining the target user has the willingness to pay if the angle of rotation in each preset direction is less than a preset angle threshold; or determining whether the probability value of the user gazing at a payment screen is greater than a preset probability threshold if the characteristic information includes user gaze information, and determining the target user has the willingness to pay if the probability value of the user gazing at a payment screen is greater than a preset probability threshold.

The payment device in one or more embodiments of the specification acquires first face image information of a target user, extracts characteristic information from the first face image information, determines whether the target user has the willingness to pay according to the characteristic information, and if the determination result is that the target user has the willingness to pay, completes a payment operation based on the face recognition function. The face image information of the target user is captured, the required characteristic information is extracted from the face image information, whether the target user has the willingness to pay is identified based on the characteristic information, and whether to start the payment function is determined. One or more embodiments of the specification not only simplify the interaction steps of users, but also improve the payment recognition accuracy to avoid unauthorized payments caused by unauthorized scanning or incorrect scanning and improve the security of the assets of users. Thus, the recognition accuracy of the willingness to pay of users is guaranteed under the premise of less interactions of users.

The embodiment of the payment device and the embodiment of the payment method are based on the same conception in the specification. Therefore, for the specific implementation of the embodiment of the payment device, please refer to the implementation of the corresponding payment method. The description is not repeated herein.

Further, corresponding to the method shown in FIGS. 1 to 4, one or more embodiments of the specification further provide a storage medium based on the same technical conception. The storage medium is used to store computer-executable instructions. In a specific embodiment, the storage medium can be a USB disk, an optical disk or a hard disk. When executed by a processor, the computer-executable instructions stored in the storage medium can implement the following processes: acquiring first face image information of a target user; extracting characteristic information from the first face image information, wherein the characteristic information includes user head posture information and/or user gaze information; determining whether the target user has the willingness to pay according to the user head posture information and/or the user gaze information; and if the target user has the willingness to pay, completing a payment operation based on the face recognition function.

In one or more embodiments of the specification, the face image information of a target user is captured, the required characteristic information is extracted from the face image information, whether the target user has the willingness to pay is identified based on the characteristic information, and whether to start the payment function is determined. One or more embodiments the specification not only simplify the interaction steps of users, but also improve the payment recognition accuracy to avoid unauthorized payments caused by unauthorized scanning or incorrect scanning of users and improve the security of the assets of users. Thus, the recognition accuracy of the willingness to pay of users is guaranteed under the premise of weak interactions of users.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

In an embodiment, when the computer-executable instructions stored in the storage medium are executed by a processor, completing a payment operation based on the face recognition function comprises: triggering and performing a face-scanning payment initiating operation to acquire second face image information based on the face recognition function; determining whether the target user has the willingness to pay according to the characteristic information extracted from the second face image information; if the target user has the willingness to pay, triggering and performing a face-scanning payment confirmation operation to complete a payment based on the corresponding payment account information of the target user.

In an embodiment, when the computer-executable instructions stored in the storage medium are executed by a processor, determining whether the target user has the willingness to pay according to the characteristic information extracted from the second face image information comprises: determining whether the corresponding current user of the second face image information is consistent with the target user; if the corresponding current user of the second face image information is consistent with the target user, determining whether the target user has the willingness to pay according to the characteristic information extracted from the second face image information.

In an embodiment, when the computer-executable instructions stored in the storage medium are executed by a processor, extracting characteristic information from the first face image information comprises: determining user head posture information of the target user by using a pre-trained head posture recognition model and based on the first face image information, wherein the user head posture information includes an angle of rotation in a preset direction; and/or, determining user gaze information of the target user by using a pre-trained gaze information recognition model and based on the characteristics of the eye region in the first face image information, wherein the user gaze information includes at least either of the probability value of the user gazing at a payment screen and the probability value of the user not gazing at the payment screen.

In an embodiment, when the computer-executable instructions stored in the storage medium are executed by a processor, the head posture recognition model is obtained through training by: acquiring a first sample data set, wherein the first sample data set includes a plurality of pieces of first sample data and each piece of the first sample data includes a correspondence between a sample face image and head posture information; determining the mean image data and variance image data of the plurality of sample face images; for each piece of the first sample data, preprocessing the sample face image contained in the piece of first sample data based on the mean image data and the variance image data to obtain a preprocessed sample face image; determining the preprocessed sample face image and the corresponding head posture information as a final first model training sample; training by using the machine learning method and based on a plurality of the first model training samples to obtain the head posture recognition model.

In an embodiment, when the computer-executable instructions stored in the storage medium are executed by a processor, the gaze information recognition model is obtained through training in the following by: acquiring a second sample data set, wherein the second sample data set includes a plurality of pieces of second sample data and each piece of the second sample data includes a correspondence between a sample eye image and gaze information; determining the mean image data and variance image data of the plurality of sample eye images; for each piece of the second sample data, preprocessing the sample eye image contained in the piece of second sample data based on the mean image data and the variance image data to obtain a preprocessed sample eye image; determining the preprocessed sample eye image and the corresponding gaze information as a final second model training sample; training by using the machine learning method and based on a plurality of the second model training samples to obtain the gaze information recognition model.

In an embodiment, when the computer-executable instructions stored in the storage medium are executed, determining whether the target user has the willingness to pay according to the user head posture information and/or the user gaze information comprises: determining whether the angle of rotation in each preset direction is less than a preset angle threshold and determining whether the probability value of the user gazing at a payment screen is greater than a preset probability threshold if the characteristic information includes user head posture information and user gaze information, and determining the target user has the willingness to pay if the angle of rotation in each preset direction is less than a preset angle threshold and the probability value of the user gazing at a payment screen is greater than a preset probability threshold; or, determining whether the angle of rotation in each preset direction is less than a preset angle threshold if the characteristic information includes user head posture information, and determining the target user has the willingness to pay if the angle of rotation in each preset direction is less than a preset angle threshold; or, determining whether the probability value of the user gazing at a payment screen is greater than a preset probability threshold if the characteristic information includes user gaze information, and determining the target user has the willingness to pay if the probability value of the user gazing at a payment screen is greater than a preset probability threshold.

When the computer-executable instructions stored in the storage medium in one or more embodiments of the specification are executed by a processor, first face image information of a target user is acquired, characteristic information is extracted from the first face image information, whether the target user has the willingness to pay is determined according to the characteristic information, and if the determination result is that the target user has the willingness to pay, a payment operation is completed based on the face recognition function. The face image information of the target user is captured, the required characteristic information is extracted from the face image information, whether the target user has the willingness to pay is identified based on the characteristic information, and whether to start the payment function is determined. One or more embodiments of the specification not only simplify the interaction steps of users, but also improve the payment recognition accuracy to avoid unauthorized payment caused by unauthorized scanning or incorrect scanning of users and improve the security of the assets of users. Thus, the recognition accuracy of the willingness to pay of users is guaranteed under the premise of less interactions of users.

The embodiment of the storage medium and the embodiment of the payment method are based on the same inventive conception in the specification. Therefore, for the specific implementation of the embodiment of the storage medium, please refer to the implementation of the corresponding payment method. The description is not repeated herein.

Some embodiments of the specification are described above. Other embodiments falling within the scope in the claims exist. In some cases, actions or steps stated in the claims can be performed in a sequence different from the one in the embodiments and the desired results can be obtained. In addition, it is unnecessarily required to show a specific sequence or continuous sequence for the process depicted in the drawings to achieve the expected result. In some embodiments, multi-task processing and concurrent processing can also be allowed or may be favorable.

In the 1990s, it can obviously be determined whether a technical improvement is a hardware improvement (for example, improvement of the circuit structure of a diode, a transistor or a switch) or software improvement (for example, improvement of method process). However, with the development of technologies, the improvements of today's many method processes have already been considered as direct improvements of hardware circuit structures. Designers can almost obtain a hardware circuit structure by programming an improved method process into a hardware circuit. Therefore, we cannot say that the improvement of a method process cannot be realized by hardware entity modules. For example, a programmable logic device (PLD), such as a field programmable gate array (FPGA) is such an integrated circuit whose logic function is determined by programming the device. Designers can themselves program a numerical symbol system to "integrate" it into a PLD, without asking a chip manufacturer to design and manufacture an application specific integrated circuit (ASIC) chip. Nowadays, programming which replaces manual manufacturing of integrated circuit chips is mostly done by a logic compiler, which is similar to a software compiler used for program development and writing. Original codes before compilation also need to be written by use of a specific programming language, for example, hardware description language (HDL). However, HDL is not the only programming language, and many other programming languages, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL) may be used. Currently, Very-High-Speed Integrated Circuit Hardware Description Language (VHDL) and Verilog are the most commonly used. Those skilled in the art should understand that a hardware circuit realizing a logic method process can easily be obtained by using some of the above-mentioned hardware description languages to perform logic programming for the method process and program it into an integrated circuit.

A controller can be realized in any proper way. For example, a controller can be a microprocessor or processor, a computer-readable medium in which computer-readable program codes (for example, software or firmware) executed by the (micro)processor are stored, a logic gate, a switch, an application specific integrated circuit (ASIC), a programmable logic controller and a built-in micro controller. Examples of a controller include but are not limited to the following microcontrollers: ARC 625D, Atmel AT91SAM, Microchip PIC18F26K20 and Silicone Labs C8051F320, and a memory controller can be realized as a part of the control logic of the memory. Those skilled in the art also know that besides a controller can be realized in the way of computer-readable program codes, the same function can completely be realized in the form of a logic gate, switch, ASIC, programmable logic controller, built-in microcontroller through logic programming of the procedure of a method. Therefore, such a controller can be considered as a hardware component and the devices used to realize different functions in the hardware component can also be considered as structures in the hardware component. Or, the devices used to realize different functions can even be considered as not only software modules realizing a method, but also structures in the hardware component.

The system, apparatus, modules or units described in the embodiments above can be realized by a computer chip or entity or be realized by a product having a function. Typical implementation equipment is a computer. Specifically, the computer can be a personal computer, a laptop computer, a cellular phone, a camera phone, a smart phone, a personal digital assistant, a media player, a navigation device, an e-mail device, a game console, a tablet computer, a wearable device or any combination of these devices.

For the convenience of description, when the apparatus is described, the apparatus is functionally divided into different units and these units are described respectively. Of course, the functions of different units can be realized in one or more pieces of software and/or hardware when one or more embodiments of the specification are implemented.

Those skilled in the art should know that one or more embodiments of the specification can provide a method, a system, or a computer program product. Therefore, one or more embodiments of the specification can be hardware-only embodiments, software-only embodiments, or software-hardware embodiments. In addition, the embodiment of a computer program product which can be implemented on one or more computer accessible storage media (including but not limited to disk memory, CD-ROM and optical memory) containing computer program codes can be adopted for the specification.

The specification is described by reference to the flowchart and/or block diagram of the method, device (system) and computer program product in one or more embodiments of the specification. It should be understood that each process in the flowchart and/or block in the block diagram and the combination of the processes in the flowchart and/or the blocks in the block diagram can be realized by computer program commands. These computer program commands can be provided in a general-purpose computer, a dedicated computer, an embedded processor or the processor of other programmable data processing equipment to produce a machine so that the commands executed by a computer or the processor of other programmable data processing equipment can produce a device used to realize the designated functions in one process or more processes in the flowchart and/or in one block or more blocks in the block diagram.

These computer program commands can also be stored in a computer-readable memory which can boot a computer or other programmable data processing equipment to work in a specific mode so that the commands stored in the computer-readable memory can produce manufactures including a command device. The command device realizes the designated functions in one process or more processes in the flowchart and/or in one block or more blocks in the block diagram.

These computer program commands can also be uploaded to a computer or other programmable data processing equipment so that a series of operation steps are performed on the computer or other programmable data processing equipment to produce the processing realized by the computer and the commands executed on the computer or other programmable data processing equipment provide the steps for realizing the designated functions in one process or more processes in the flowchart and/or in one block or more blocks in the block diagram.

In a typical configuration, a computer device comprises one or more processors (CPU), an input/output interface, a network interface and a memory.

The memory may include a volatile memory, a random access memory (RAM) and/or a nonvolatile memory of computer-readable media, for example, a read-only memory or a flash RAM. The memory is an example of computer-readable media.

Computer-readable media include volatile and nonvolatile media and mobile and immobile media, and they can realize information storage by use of any method or technique. Information can be computer-readable instructions, data structures, modules of a program or other data. Examples of storage media of a computer include but are not limited to phase-change RAM (PRAM), static random access memory (SRAM), dynamic random access memory (DRAM), other types of random access memory (RAM), read-only memory (ROM), electrically erasable programmable read-only memory (EEPROM), flash memory or other memory techniques, compact disk read-only memory (CD-ROM), digital versatile disk (DVD), cassette tape, magnetic tape, magnetic disk or other storage device or any other non-transmission medium, and they can be used to store information which can be accessed by a computer device. According to the definition in this document, computer-readable media exclude transitory media, for example, modulated data signals and carriers.

It should also be noted that the terms "comprise" and "contain" and their variants are intended to cover non-exclusive inclusions so that the process, method, commodity or device comprising a series of elements not only comprises these elements, but also comprises other elements not listed clearly, or comprises the elements intrinsic to the process, method, commodity or device. Without any more restrictions, the element defined by "comprising one . . . " does not exclude the case that other identical elements exist in the process, method, commodity or device which comprises the element.

Those skilled in the art should know that one or more embodiments of the specification can provide a method, a system or a computer program product. Therefore, one or more embodiments of the specification can be hardware-only embodiments, software-only embodiments or software-hardware embodiments. In addition, the embodiment of a computer program product which can be implemented on one or more computer accessible storage media (including but not limited to disk memory, CD-ROM and optical memory) containing computer program codes can be adopted for the specification.

The specification can be described in the general context of computer-executable instructions executed by a computer, for example, a program module. Generally, a program module comprises a routine, program, object, component and data structure which execute a specific task or realize a specific abstract data type. The specification can also be carried out in distributed computing environments. In the distributed computing environments, tasks are executed by remote processing equipment connected over a communication network. In distributed computing environments, a program module can be in a local or remote computer storage medium including a storage device.

The embodiments in the description are described in a progressive way. For the same or similar parts between the embodiments, refer to these embodiments. Each embodiment focuses on the differences from the others. In particular, the description of the embodiments of the system is simple because they are similar to the embodiments of the method. For the related parts, see the description of the embodiments of the method.

The above are only one or more embodiments of the specification but are not used to restrict the specification. Those skilled in the art can make various changes and modifications to the specification. Any modification, equivalent replacement, and improvement within the spirit and principle of the specification should fall within the scope of the claims of the specification.

What is claimed is:

1. A payment method based on face recognition, comprising:
    training, by one or more processors, a first machine learning model based on a plurality of first model training samples to obtain a head posture recognition model, wherein the plurality of first model training samples is obtained by:
        acquiring a plurality of pieces of first sample data, and each of the plurality of pieces of first sample data includes a sample face image and a correspondence between the sample face image and head posture information;
        for each of the plurality of pieces of first sample data, preprocessing the sample face image to obtain a preprocessed sample face image; and
        setting the preprocessed sample face image and the corresponding head posture information as one of the plurality of first model training samples; and
    training, by the one or more processors, a second machine learning model based on a plurality of second model training samples to obtain a gaze information recognition model, wherein the plurality of second model training samples is obtained by:
        acquiring a plurality of pieces of second sample data, and each of the plurality of pieces of second sample data includes a sample eye image and a correspondence between the sample eye image and gaze information;

for each of the plurality of pieces of second sample data, preprocessing the sample eye image to obtain a preprocessed sample eye image; and
setting the preprocessed sample eye image and the corresponding gaze information as one of the plurality of second model training samples;
acquiring, by the one or more processors, first face image information of a target user;
upon receiving the first face image information of the target user, extracting, by the one or more processors, first head posture information of the target user from the first face image information by inputting the first face image information to the head posture recognition model and obtaining an output of the head posture recognition model as the first head posture information of the target user, and extracting, by the one or more processors, first gaze information of the target user from the first face image information by inputting the first face image information to the gaze information recognition model and obtaining an output of the gaze information recognition model as the first gaze information of the target user;
detecting, by the one or more processors, whether the target user requests a payment operation according to the first head posture information of the target user and the first gaze information of the target user by:
determining an angle of rotation in each preset direction with respect to each preset direction, and determining whether the determined angle of rotation in each preset direction is less than an angle threshold, wherein the first head posture information includes the angle of rotation in each preset direction;
determining a probability value that a user gazes at a payment screen, and determining whether the determined probability value is greater than a probability threshold, wherein the first gaze information includes the probability value that a user gazes at a payment screen; and
in response to determining that the angle of rotation in each preset direction is less than the angle threshold and that the probability value that a user gazes at a payment screen is greater than the probability threshold, detecting that the target user requests the payment operation according to the first face image information;
in response to detecting that the target user requests the payment operation according to the first face image information, detecting, by the one or more processors, whether the target user requests the payment operation according to second face image information; and
in response to detecting that the target user requests the payment operation according to the second face image information, completing, by the one or more processors, the payment operation.

2. The method as claimed in claim 1, wherein
the detecting, by the one or more processors, whether the target user requests the payment operation according to second face image information comprises:
triggering and performing a payment initiating operation comprises:
acquiring the second face image information; and
determining whether second head posture information and second gaze information extracted from the second face image information indicate that the target user requests the payment operation; and
the completing, by the one or more processors, the payment operation comprises:
in response to determining that the second head posture information and the second gaze information indicate that the target user requests the payment operation, triggering and performing a payment confirmation operation to complete the payment operation based on payment account information corresponding to the target user.

3. The method as claimed in claim 2, wherein the determining whether second head posture information and second gaze information indicate that the target user requests the payment operation comprises:
determining whether a current user corresponding to the second face image information is consistent with the target user; and
in response to determining that the current user is consistent with the target user, detecting whether the target user requests the payment operation according to the second head posture information and the second gaze information extracted from the second face image information.

4. The method as claimed in claim 1, wherein the obtaining an output of the gaze information recognition model as the first gaze information of the target user comprises determining the first gaze information of the target user using the gaze information recognition model based on characteristics of an eye region in the first face image information.

5. The method as claimed in claim 1, wherein the preprocessing the sample face image to obtain a preprocessed sample face image comprises:
determining mean image data and variance image data of a plurality of sample face images included in the plurality of pieces of first sample data; and
for each of the plurality of pieces of first sample data, preprocessing the sample face image based on the mean image data and the variance image data to obtain the preprocessed sample face image.

6. The method as claimed in claim 1, wherein the preprocessing the sample eye image to obtain a preprocessed sample eye image comprises:
determining mean image data and variance image data of a plurality of sample eye images included in the plurality of pieces of second sample data; and
for each of the plurality of pieces of second sample data, preprocessing the sample eye image based on the mean image data and the variance image data to obtain the preprocessed sample eye image.

7. The method as claimed in claim 1, wherein the angle of rotation in each preset direction comprises a pitch angle, a yaw angle, and a roll angle, wherein the pitch angle refers to an angle of rotation around an X-axis, the yaw angle refers to an angle of rotation around a Y-axis, and the roll angle refers to an angle of rotation around a Z-axis.

8. A payment device based on face recognition, comprising:
one or more processors, and
a non-transitory computer-readable storage medium storing instructions, when executed by the one or more processors to cause the device to perform operations comprising:
training a first machine learning model based on a plurality of first model training samples to obtain a head posture recognition model, wherein the plurality of first model training samples is obtained by:
acquiring a plurality of pieces of first sample data, and each of the plurality of pieces of first sample data includes a sample face image and a correspondence between the sample face image and head posture information;
for each of the plurality of pieces of first sample data, preprocessing the sample face image to obtain a preprocessed sample face image; and
setting the preprocessed sample face image and the corresponding head posture information as one of the plurality of first model training samples; and
training a second machine learning model based on a plurality of second model training samples to obtain a gaze information recognition model, wherein the plurality of second model training samples is obtained by:
acquiring a plurality of pieces of second sample data, and each of the plurality of pieces of second sample data includes a sample eye image and a correspondence between the sample eye image and gaze information;
for each of the plurality of pieces of second sample data, preprocessing the sample eye image to obtain a preprocessed sample eye image; and
setting the preprocessed sample eye image and the corresponding gaze information as one of the plurality of second model training samples;
acquiring first face image information of a target user;
upon receiving the first face image information of the target user, extracting first head posture information of the target user from the first face image information by inputting the first face image information to the head posture recognition model and obtaining an output of the head posture recognition model as the first head posture information of the target user, and extracting first gaze information of the target user from the first face image information by inputting the first face image information to the gaze information recognition model and obtaining an output of the gaze information recognition model as the first gaze information of the target user;
detecting whether the target user requests a payment operation according to the first head posture information of the target user and the first gaze information of the target user by:
determining an angle of rotation in each preset direction with respect to each preset direction, and determining whether the determined angle of rotation in each preset direction is less than an angle threshold, wherein the first head posture information includes the angle of rotation in each preset direction;
determining a probability value that a user gazes at a payment screen, and determining whether the determined probability value is greater than a probability threshold, wherein the first gaze information includes the probability value that a user gazes at a payment screen; and
in response to determining that the angle of rotation in each preset direction is less than the angle threshold and that the probability value that a user gazes at a payment screen is greater than the probability threshold, detecting that the target user requests the payment operation according to the first face image information;
in response to detecting that the target user requests the payment operation according to the first face image information, detecting whether the target user requests the payment operation according to second face image information; and in response to detecting that the target user requests the payment operation according to the second face image information, completing the payment operation.

9. The device as claimed in claim 8, wherein the detecting whether the target user requests the payment operation according to second face image information comprises:
triggering and performing a payment initiating operation comprises:
acquiring the second face image information; and
determining whether second head posture information and second gaze information extracted from the second face image information indicate that the target user requests the payment operation; and
the completing the payment operation comprises:
in response to determining that the second head posture information and the second gaze information indicate that the target user requests the payment operation, triggering and performing a payment confirmation operation to complete the payment operation based on payment account information corresponding to the target user.

10. The device as claimed in claim 9, wherein the determining whether second head posture information and second gaze information indicate that the target user requests the payment operation comprises:
determining whether a current user corresponding to the second face image information is consistent with the target user; and
in response to determining that the current user is consistent with the target user, detecting whether the target user requests the payment operation according to the second head posture information and the second gaze information extracted from the second face image information.

11. The device as claimed in claim 8, wherein the obtaining an output of the gaze information recognition model as the first gaze information of the target user comprises determining the first gaze information of the target user using the gaze information recognition model based on characteristics of an eye region in the first face image information.

12. The device as claimed in claim 8, wherein the preprocessing the sample face image to obtain a preprocessed sample face image comprises:
determining mean image data and variance image data of a plurality of sample face images included in the plurality of pieces of first sample data; and
for each of the plurality of pieces of first sample data, preprocessing the sample face image based on the mean image data and the variance image data to obtain the preprocessed sample face image.

13. The device as claimed in claim 8, wherein the preprocessing the sample eye image to obtain a preprocessed sample eye image comprises:
determining mean image data and variance image data of a plurality of sample eye images included in the plurality of pieces of second sample data; and
for each of the plurality of pieces of second sample data, preprocessing the sample eye image based on the mean image data and the variance image data to obtain the preprocessed sample eye image.

14. The device as claimed in claim 8, wherein the angle of rotation in each preset direction comprises a pitch angle, a yaw angle, and a roll angle, wherein the pitch angle refers to an angle of rotation around an X-axis, the yaw angle refers to an angle of rotation around a Y-axis, and the roll angle refers to an angle of rotation around a Z-axis.

15. A non-transitory computer-readable storage medium for a payment based on face recognition, configured with instructions when executed by one or more processors to cause the one or more processors to perform operations comprising:
training a first machine learning model based on a plurality of first model training samples to obtain a head posture recognition model, wherein the plurality of first model training samples is obtained by:
acquiring a plurality of pieces of first sample data, and each of the plurality of pieces of first sample data includes a sample face image and a correspondence between the sample face image and head posture information;
for each of the plurality of pieces of first sample data, preprocessing the sample face image to obtain a preprocessed sample face image; and
setting the preprocessed sample face image and the corresponding head posture information as one of the plurality of first model training samples; and
training a second machine learning model based on a plurality of second model training samples to obtain a gaze information recognition model, wherein the plurality of second model training samples is obtained by:
acquiring a plurality of pieces of second sample data, and each of the plurality of pieces of second sample data includes a sample eye image and a correspondence between the sample eye image and gaze information;
for each of the plurality of pieces of second sample data, preprocessing the sample eye image to obtain a preprocessed sample eye image; and
setting the preprocessed sample eye image and the corresponding gaze information as one of the plurality of second model training samples;
acquiring first face image information of a target user;
upon receiving the first face image information of the target user, extracting first head posture information of the target user from the first face image information by inputting the first face image information to the head posture recognition model and obtaining an output of the head posture recognition model as the first head posture information of the target user, and extracting first gaze information of the target user from the first face image information by inputting the first face image information to the gaze information recognition model and obtaining an output of the gaze information recognition model as the first gaze information of the target user;
detecting whether the target user requests a payment operation according to the first head posture information of the target user and the first gaze information of the target user by:
determining an angle of rotation in each preset direction with respect to each preset direction, and determining whether the determined angle of rotation in each preset direction is less than an angle threshold, wherein the first head posture information includes the angle of rotation in each preset direction;
determining a probability value that a user gazes at a payment screen, and determining whether the determined probability value is greater than a probability threshold, wherein the first gaze information includes the probability value that a user gazes at a payment screen; and
in response to determining that the angle of rotation in each preset direction is less than the angle threshold and that the probability value that a user gazes at a payment screen is greater than the probability threshold, detecting that the target user requests a payment operation according to the first face image information;
in response to detecting that the target user requests the payment operation according to the first face image information, detecting whether the target user requests the payment operation according to second face image information; and
in response to detecting that the target user requests a payment operation according to the second face image information, completing the payment operation.

16. The storage medium as claimed in claim 15, wherein the detecting whether the target user requests the payment operation according to second face image information comprises:
triggering and performing a payment initiating operation comprises:
acquiring the second face image information; and
determining whether second head posture information and second gaze information extracted from the second face image information indicate that the target user requests a payment operation; and
the completing the payment operation comprises:
in response to determining that the second head posture information and the second gaze information indicate that the target user requests a payment operation, triggering and performing a payment confirmation operation to complete the payment operation based on payment account information corresponding to the target user.

17. The storage medium as claimed in claim 16, wherein the determining whether second head posture information and second gaze information indicate that the target user requests a payment operation comprises:
determining whether a current user corresponding to the second face image information is consistent with the target user; and
in response to determining that the current user is consistent with the target user, detecting whether the target user requests a payment operation according to the second head posture information and the second gaze information extracted from the second face image information.

18. The storage medium as claimed in claim 15, wherein the obtaining an output of the gaze information recognition model as the first gaze information of the target user comprises determining first the gaze information of the target user using the gaze information recognition model based on characteristics of an eye region in the first face image information.

19. The storage medium as claimed in claim 15,
wherein preprocessing the sample face image to obtain a preprocessed sample face image comprises:
determining mean image data and variance image data of a plurality of sample face images included in the plurality of pieces of first sample data; and
for each of the plurality of pieces of first sample data, preprocessing the sample face image based on the mean image data and the variance image data to obtain the preprocessed sample face image; and
wherein the preprocessing the sample eye image to obtain a preprocessed sample eye image comprises:
determining mean image data and variance image data of a plurality of sample eye images included in the plurality of pieces of second sample data; and for each of the plurality of pieces of second sample data, preprocessing the sample eye image based on the mean image data and the variance image data to obtain the preprocessed sample eye image.

20. The storage medium as claimed in claim 15, wherein the angle of rotation in each preset direction comprises a pitch angle, a yaw angle, and a roll angle, wherein the pitch angle refers to an angle of rotation around an X-axis, the yaw angle refers to an angle of rotation around a Y-axis, and the roll angle refers to an angle of rotation around a Z-axis.

* * * * *